(12) United States Patent
Xing et al.

(10) Patent No.: US 10,189,973 B2
(45) Date of Patent: Jan. 29, 2019

(54) LCP DERIVATIVE/SOFT MAGNETIC FERRITE COMPOSITE MATERIAL AND PREPARATION METHOD THEREFOR

(71) Applicant: YUNNAN INFINE NEO-MATERIAL CO., LTD, Kunming (CN)

(72) Inventors: Mengjiang Xing, Kunming (CN); Mingang Zheng, Kunming (CN)

(73) Assignee: YUNNAN INFINE NEO-MATERIAL CO., LTD, Kunming (CN)

( * ) Notice: Subject to any disclaimer, the term of this patent is extended or adjusted under 35 U.S.C. 154(b) by 0 days.

(21) Appl. No.: 15/304,107

(22) PCT Filed: Apr. 13, 2015

(86) PCT No.: PCT/CN2015/076481
§ 371 (c)(1),
(2) Date: Oct. 14, 2016

(87) PCT Pub. No.: WO2015/158236
PCT Pub. Date: Oct. 22, 2015

(65) Prior Publication Data
US 2017/0210878 A1    Jul. 27, 2017

(30) Foreign Application Priority Data
Apr. 14, 2014 (CN) .......................... 2014 1 0147670

(51) Int. Cl.
*C08K 3/22* (2006.01)
*C08G 69/44* (2006.01)
(Continued)

(52) U.S. Cl.
CPC ................ *C08K 3/22* (2013.01); *C08G 69/44* (2013.01); *C08G 69/46* (2013.01); *C08J 5/24* (2013.01);
(Continued)

(58) Field of Classification Search
CPC ....................................................... C08K 3/22
(Continued)

(56) References Cited

U.S. PATENT DOCUMENTS

| 5,492,946 A | 2/1996 | Huspeni et al. |
| 6,666,990 B2 | 12/2003 | Shepherd et al. |
| 2011/0046335 A1 | 2/2011 | Fernandes |

FOREIGN PATENT DOCUMENTS

| CN | 1491247 A | 4/2004 |
| CN | 102199331 A | 9/2011 |

(Continued)

OTHER PUBLICATIONS

CN 103881377 translation.*
(Continued)

*Primary Examiner* — Duc Truong
(74) *Attorney, Agent, or Firm* — Renner Otto Boisselle & Sklar (57) ABSTRACT

The present invention provides an LCP derivative/soft magnetic ferrite composite material, which is prepared by complexing and assembling an LCP derivative as a host and soft magnetic ferrite particles as a guest. The present invention also provides a method for preparing the composite material. The composite material of the present invention has high stability and is not easily dissociated, and has high customized magnestic permeability, dielectricity, thermal stability, environmental resistance, and chemical resistance; and the preparation process of the composite material meets the energy-saving and emission reduction requirements. Therefore, the composite material has a wide industrial application prospect. The composite material of the present invention can be widely applied to the wireless communication field, the aviation, spaceflight and military fields, the micro- (Continued)

wave and radio frequency component application field, the automotive electronic component field, and the like.

10 Claims, 2 Drawing Sheets (51) Int. Cl.
C08G 69/46 (2006.01)
H01F 1/36 (2006.01)
C08J 5/24 (2006.01)
H01F 1/37 (2006.01)

(52) U.S. Cl.
CPC ............... *H01F 1/36* (2013.01); *H01F 1/37* (2013.01); *C08K 2003/2265* (2013.01); *C08K 2201/01* (2013.01); *C08K 2201/011* (2013.01)

(58) Field of Classification Search
USPC ........................................ 528/319
See application file for complete search history.

(56) References Cited

FOREIGN PATENT DOCUMENTS

| | | |
|---|---|---|
| CN | 103881377 A | 6/2014 |
| EP | 2 471 835 A | 7/2012 |
| JP | 2004352937 A | 12/2004 |
| JP | 2009096920 A | 5/2009 |
| JP | 2012187766 A | 10/2012 |

OTHER PUBLICATIONS

International Search Report for corresponding International Application No. PCT/CN2015/076481 dated May 27, 2015.
Office Action issued in corresponding Chinese Application No. 20150821026811670 dated Aug. 26, 2015.

* cited by examiner

LCP DERIVATIVE/SOFT MAGNETIC FERRITE COMPOSITE MATERIAL AND PREPARATION METHOD THEREFOR

This application is a national phase of International Application No. PCT/CN2015/076481 filed Apr. 13, 2015 which claims priority to Application No. CN 201410147670.6 filed Apr. 14, 2014.

TECHNICAL FIELD

The present invention relates to the field of magnetic material, particular to a host-guest composite material formed by LCP (Liquid crystal polymer) derivative and soft magnetic ferrite and preparation method therefor.

BACKGROUND ART

Soft magnetic supramolecular composite material is a kind of great potential magnetic material, and it is expected to be widely used in the wireless communication field, the aviation, spaceflight and military fields, the microwave and radio frequency component application field, the automotive electronic component field, and the like. However, the conventional technologies mainly include blending and coating technologies which are mainly dominated by a small number of multinational companies. Researches in China, such as in No. 14 Research Institute of China electronics technology group, Zhejiang University, and UESTC (University of Electronic Science and Technology of China), are still stay in laboratory stage. Currently, the industrialization of soft magnetic supramolecular composite material has great significance for domestic communication technology, information processing technology and security intelligence in national defense.

As an important branch of supramolecular material synthetic chemistry, host-guest complex assembly becomes a new hot spot of self-assembled chemical researches because of its recognition, spontaneity under mild condition, product stability, without introducing unnecessary impurity phase (such as coupling agent, evocating agent, crosslinking agent, dispersing agent, stabilizing agent and adhesion agent), and many other advantages, and opens the door to the synthesis and industrial development of supramolecular composite materials.

The development of host-guest complex assembly reflects the following three aspects: 1. Researches on recognition, precisely, researches on the intermolecular forces of the host-guest complex. 2. Researches on synthesis of host structure. Current researches of the host mostly focus on crown ether, cyclodextrin, calixarene, pillararene, cyclophane, cyclic peptide, porphyrin, phthalocyanine, cucurbituril, dendrimer, fullerene, nanotube, perylene diimide and other macromolecules or oligomers. 3. Researches on guest. However, the functions of guest are only limited to the information recognition (host-guest complex recognition), or the penetrability of the guest after the assembly in different systems (such as hydrophilic system hydrophobic system, acid/base system, etc.), relatively few researches are on other functions.

SUMMARY OF THE INVENTION

In order to expand the species of the host-guest complex assembly magnetic composite materials and further improve their performances, one object of the present invention is to provide a LCP (Liquid crystal polymer) derivative/soft magnetic ferrite composite material.

Another object of the present invention is to provide a preparation method of the said composite material.

The LCP derivative/soft magnetic ferrite composite material provided by the present invention is prepared by complexing and assembling an LCP derivative as a host and soft magnetic ferrite particles as a guest, wherein, the LCP derivative comprises the following structural units:

and the molar ratio of d b) to c is 1:1.

In the above-mentioned composite material, the weight-average molecular weight of the LCP derivative is 20000~35000, and the polydispersity index of the LCP derivative is less than 1.25, preferably 1.0~1.25.

In the above-mentioned composite material, the ratio of structural unit a to structural unit b can be 0~1:1~0, preferably 0.2~1:0.8~0, more preferably 0.2~0.8:0.8~0.2.

In the above-mentioned composite material, the ratio of LCP derivative to soft magnetic ferrite may be determined according to the desired performances of composite material such as permeability; preferably, the molar ratio of structural unit c to soft magnetic ferrite particles is 5~6:1.

In the above-mentioned composite material, the soft magnetic ferrite particles may be any kind or any size of conventional soft magnetic ferrite composite materials, and different kinds of ferrite particles may be selected according to different application requirements for permeability and high frequency characteristics; MnZn ferrite or NiZn ferrite is preferred. Preferably, the size of the soft magnetic ferrite particles is 20 nm or less.

Figure 1:
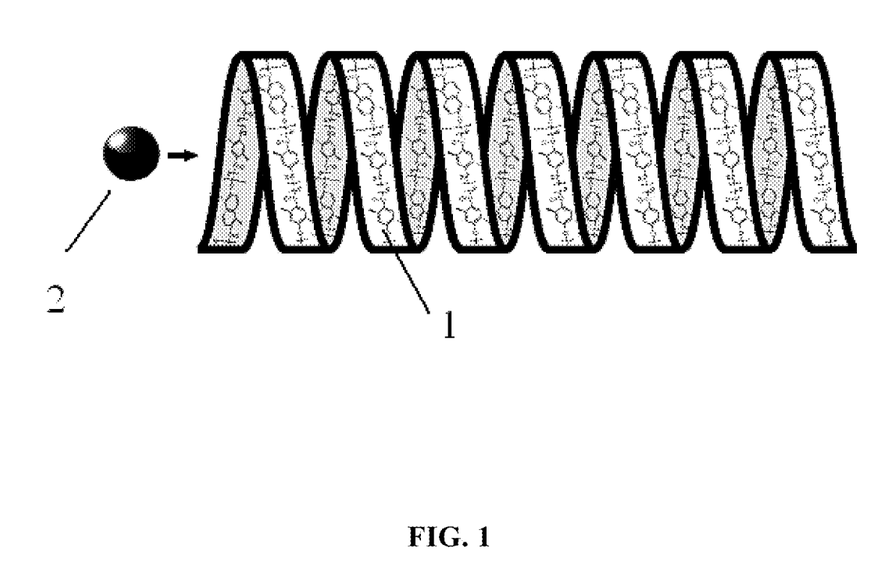
FIG. 1 is a schematic view showing the host-guest complex assembling process of the composite material of the present invention.

The preparation method of the LCP derivative/soft magnetic ferrite composite material provided by the present invention comprises the steps of:

A. reacting 2,5-dimethyl-p-acetoxybenzoic acid, 2,5-dimethyl-p-aminobenzoic acid and 1,5-dimethyl-6-acetyloxy-2-naphthoic acid in presence of an acidic catalyst to prepare a LCP derivative oligomer;

B. polarizing the LCP derivative oligomer obtained in step A to form a helical oligomer;

C. mixing the helical oligomer obtained in step B with soft magnetic ferrite particles and subjecting to host-guest complex assembly;

D. polycondensating the complex assembled material obtained in step C to obtain the said composite material.

wherein, the step A comprises: dissolving 2,5-dimethyl-p-acetoxybenzoic acid, 2,5-dimethyl-p-aminobenzoic acid and 1,5-dimethyl-6-acetyloxy-2-naphthoic acid in acetic anhydride, adding concentrated sulfuric acid as a catalyst and reacting for 2 to 5 hours at 280~310° C. to prepare the LCP derivative oligomer; wherein, (2,5-dimethyl-p-acetoxybenzoic acid and 2,5-dimethyl-p-aminobenzoic acid): 1,5-dimethyl-6-acetyloxy-2-naphthoic acid:acetic anhydride:concentrated sulfuric acid is in the molar ratio of 1:1: 5~15:0.005~0.02.

wherein, the step B comprises: dissolving the LCP derivative oligomer obtained in step A in acetic anhydride to form a solution having a volume percentage concentration of 20~50%, then polarizating for 1~3 hours in an electric field generator under stirring. The polymer is orientated with the direction of the electric field in the polarization, and eventually it presents a helical cavity structure as shown in FIG. 1.

Preferably, the pulse voltage of the electric field generator is −100~100 v, the pulse current is 200~250 mA, the stirring speed in the polarization is 2500~3000 R/min, after polarization, the stirring speed is reduced to 1000~1200 R/min and maintains for 3~4 hours to obtain the helical oligomer.

Wherein, the step C comprises: dissolving the soft magnetic ferrite particles in alkyl imidazolium ionic liquid, mixing with the helical oligomer obtained in step B at 40~60° C. and complex assembling for 3~8 hours, then adding water to remove the ionic liquid by extraction.

Preferably, the ionic liquid is 3~6 times molar amount of the soft magnetic ferrite particles, and the ionic liquid is selected from $[Bmim]^+[PF_6]^-$, $[Bmim]^+[BF_4]^-$ or $[Bmim]^+[HSO_4]^-$.

Preferably, a stirring process is used during the complex assembly, and the stirring speed may be 500~1000 R/min.

Wherein, the step D comprises: polycondensating the complex assembled material obtained in step C for 6~12 hours in a vacuum internal mixer, followed by extruding and pelletizing, the composite material is obtained, wherein, the polycondensation temperature is 325~340° C., and the vacuum degree is 200 Pa~1 KPa.

In the complex assembly process of the above-described preparation method, the cations of soft magnetic ferrite can enter into the cavities of the helical oligomer to form electrostatic bonds having a plurality of bonding points with the carbonyl oxygen, the ester group and the delocalized electron clouds of phenyl/naphthyl in the oligomer, so that the obtained host-guest assembly material can be the lowest-energy structure.

Compared with the prior art, the composite material of the present invention has the following advantages:

1. Other than the composite material prepared by ordinary blending or coating method, the combining effect of guest and host in the composite material of the present invention is the comprehensive effect of multi-bonding points, the superimposed binding energy of which is almost equivalent (sometimes more than) to covalent bonds, therefore the composite material of the present invention has good stability and is not vulnerable to be dissociated. Furthermore, the bonding energy level is low, because the intermolecular force for bonding includes hydrogen bond, electrostatic force and Van der Waals force (none of them is covalent bond), so the spontaneity and low conditionality of the host-guest complex assembly can be guaranteed, and the energy-saving and emission reduction requirements can be met.

2. The research of host in the composite material of the present invention is extended from traditional macromolecules or oligomer to high polymer, the obtained host-guest complex assembly material has better dielectricity, thermal stability, environmental resistance, chemical resistance and other performances by using the LCP derivative with high dielectricity, stability, multi-bonding points and other characteristics.

3. The composite material provided by the present invention has significant effect in terms of performances, and it is expected to be widely used in the wireless communication field, the aviation, spaceflight and military fields, the microwave and radio frequency component application field, the automotive electronic component field, and the like.

The composite material preparation method provided by the present invention is simple in process and the operation conditions are mild, so it has an industrial application prospect.

BRIEF DESCRIPTION OF THE DRAWINGS

Wherein, 1: LCP derivative host; 2: soft magnetic ferrite guest.

DETAILED DESCRIPTION OF THE INVENTION

In order to make the purpose, technical solutions and advantages of the present invention more clear, the technical solutions of the exemplary examples of the present invention will be further described below. Unless otherwise specified, in the Examples all the reagents used are commercially available and all the operations used are conventional in the art.

Example 1

A. Preparation of LCP Derivative Oligomer

The reaction was fed with 2,5-dimethyl-p-acetoxybenzoic acid (mol) (1), 2,5-dimethyl-p-aminobenzoic acid (mol) (2), 1,5-dimethyl-6-acetyloxy-2-naphthoic acid (mol) (3), acetic anhydride (mol) and concentrated sulfuric acid (mol) (the mass fraction is 98%) in the molar ratio of 0.5:0.5:1:8:0.01 (mol), reaction temperature was about 290° C., reaction time was about 4 h, and LCP derivative oligomer was obtained. Wherein, the formulas of 1, 2, and 3 were as follows:

time was 6 h, the stirring speed during assembling was maintained at about 700 R/min. Then deionized water with equal volume to step C system was used to extract the ionic liquid $[Bmim]^+[PF_6]^-$ in step C system in order to removed it, and the remaining material in the system was for later use.

D. The material obtained in step C was added to a vacuum internal mixer for polycondensating, the temperature was set at 330° C., the vacuum degree was set at 600 Pa, the time was set at about 9 h, after extruding and pelletizing, the composite material prepared by host-guest complex assembly was obtained. The weight-average molecular weight of the LCP derivative was 24384, and the polydispersity index was 1.17.

Examples 2-4

Examples 2-4 are mainly the same as Example 1 except the monomer ratio of step A, as shown in Table 1.

TABLE 1

Monomer ratio of Examples 2-4

| Number | 2,5-dimethyl-p-acetoxybenzoic acid (mol) | 2,5-dimethyl-p-aminobenzoic acid (mol) | 1,5-dimethyl-6-acetyloxy-2-naphthoic acid (mol) | acetic anhydride (mol) | concentrated sulfuric acid (mol) |
|---|---|---|---|---|---|
| Example 2 | 1 | 0 | 1 | 2 | 0.01 |
| Example 3 | 0.8 | 0.2 | 1 | 2 | 0.01 |
| Example 4 | 0.2 | 0.8 | 1 | 2 | 0.01 |

Figure 2A:
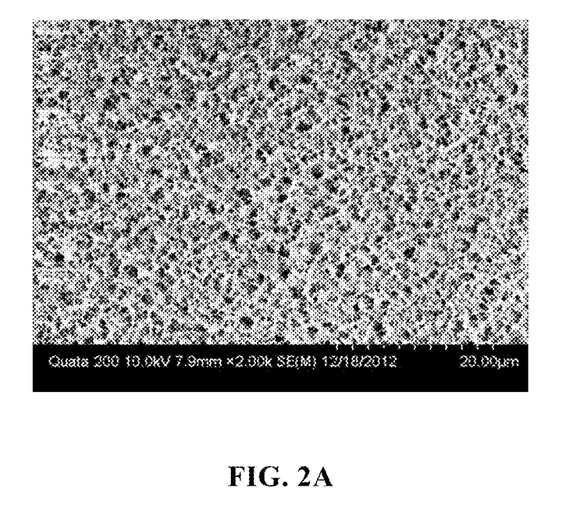
FIG. 2A and FIG. 2B are SEM images of the polarized polymer with helical cavities under different precision respectively, which are obtained during the preparation process of the composite material of the present invention.
Figure 2B:
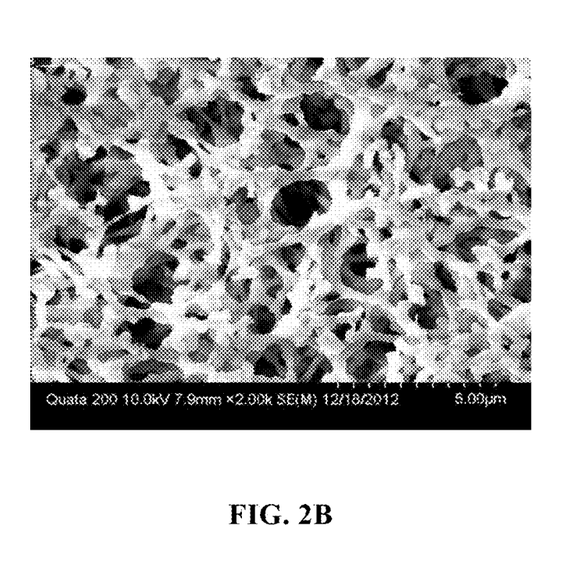

B. A solution was prepared with the LCP derivative oligomer (V) obtained in step A and acetic anhydride (V) in the volume ratio of 1:2 (V), the solution was then placed in a pulsed DC electric field generator (Wuxi Behemoth SCIENCE Ltd., Model: BM-562) with a high speed stirrer and polarized for 2 h, the pulse voltage of the electric field generator was −100~100 v, the pulse current was 220 mA, the stirring speed in the polarization was 2800 R/min, after polarization, the stirring speed was reduced to about 1120 R/min and maintained for 3 h to obtain the polarized oligomer with helical cavities, as shown in FIG. 2.

C. Soft magnetic ferrite nano particles $Ni_{0.3}Zn_{0.7}Fe_2O_3$ were added into alkyl imidazolium ionic liquid $[Bmim]^+[PF_6]^-$, a mixture was prepared with LCP derivative oligomer (in the molar amount of 1,5-dimethyl-6-acetyloxy-2-naphthoic acid in step A) (mol), $Ni_{0.3}Zn_{0.7}Fe_2O_3$ (mol) and $[Bmim]^+[PF_6]^-$ (mol) in the molar ratio of 5:1:4 (mol), and heated to about 50° C. until it was dissolved, then the mixture was added into the polymer solution obtained in step B for host-guest complex assembling, the assembling Examples 5-7

Examples 5-7 are mainly the same as Example 1 except the reaction temperature and the reaction time of step A, as shown in Table 2.

TABLE 2

Reaction conditions of Examples 5-7

| Number | Reaction temperature (° C.) | Reaction time (h) |
|---|---|---|
| Example 5 | 280 | 5 |
| Example 6 | 300 | 3 |
| Example 7 | 310 | 2 |

Examples 8-16

Examples 8-16 are mainly the same as Example 1 except the material ratio of step C, as shown in Table 3. In Table 3, a represents $Ni_{0.3}Zn_{0.7}Fe_2O_3$, b represents $Ni_{0.6}An_{0.4}Fe_2O_3$, c represents $Mn_{0.64}Zn_{0.36}Fe_2O_3$, and d represents $Mn_{0.52}Zn_{0.48}Fe_2O_3$.

TABLE 3

Material ratio of Examples 8-16

| Number | 1,5-dimethyl-6-acetyloxy-2-naphthoic acid (mol) | a (mol) | b (mol) | c (mol) | d (mol) | $[Bmim]^+[BF_4]^-$ (mol) | $[Bmim]^+[HSO_4]$ (mol) |
|---|---|---|---|---|---|---|---|
| Example 8 | 6 | 1 | — | — | — | — | — |
| Example 9 | 5 | — | 1 | — | — | — | — |
| Example 10 | 6 | — | 1 | — | — | — | — |
| Example 11 | 5 | — | — | 1 | — | — | — |
| Example 12 | 6 | — | — | 1 | — | — | — |
| Example 13 | 5 | — | — | — | 1 | — | — |
| Example 14 | 6 | — | — | — | 1 | — | — |
| Example 15 | 5 | 1 | — | — | — | 4 | — |
| Example 16 | 5 | 1 | — | — | — | — | 4 |

Examples 17-18

Examples 17-18 are mainly the same as Example 1 except the reaction conditions of step D, as shown in Table 4.

TABLE 4

Reaction conditions of Examples 17-18

| Number | Reaction temperature (° C.) | Vacuum degree (Pa) | Reaction time (h) |
|---|---|---|---|
| Example 17 | 325 | 200 | 12 |
| Example 18 | 340 | 1000 | 6 |

Performance Test

The performances of the composite materials prepared in Examples 1-18 were tested. Test items and methods were as follows:

I. Dielectric Property

The obtained composite materials were injection moulded to wafers, then subjected to grinding, polishing and cleaning, dielectric property was analyzed and tested by using Agilent radiofrequency impedance analyzer RF-4991A, and the frequency was 1 MHz~1 GHz.

2. Magnetic Property

The obtained composite materials were injection moulded to rings, then subjected to grinding, polishing and cleaning, magnetic property was analyzed and tested by using Agilent radiofrequency impedance analyzer RF-4991A, and the frequency was 1 MHz~1 GHz.

3. Volume Resistivity

Volume resistivity was tested in accordance with the national standard GB/T 1410-2006.

4. Electric Strength

Electric strength was tested in accordance with the national standard GB/T 1408.1-2006.

5. Heat Distortion Temperature

Heat distortion temperature was tested by using thermal deformation vicat temperature meter FYWK-300 in accordance with the national standard GB/T 1633-2000.

6. Tensile Strength, Tensile Strain at Break

Tensile strength and tensile strain at break were tested in accordance with the national standard GB/T 1040-2.006.

7. Bending Strength

Bending strength was tested in accordance with the national standard GB/T 9341-2008.

8. Molecular Weight and Distribution

Molecular weight and polydispersity index of LCP derivative were determined by gel permeation chromatography GPC method.

The test results were shown in Table 5.

TABLE 5

Results of performance test

| Number | Permittivity $\varepsilon_r$ (1 M~1 GHz) | Dielectric loss tangent tan δ (1 M~1 GHz) | permeability $\mu_r$ (1 M~1 GHz) | magnetic loss tan $\delta_m$ (1 M~1 GHz) | Volume resistivity ($\times 10^{16}$ Ω · cm) | Electric strength (KV/mm) |
|---|---|---|---|---|---|---|
| Example 1 | 3.6 | $6.3 \times 10^{-4}$ | 4.1 | $2.4 \times 10^{-3}$ | 2.1 | 32 |
| Example 2 | 3.1 | $5.6 \times 10^{-4}$ | 3.9 | $2.2 \times 10^{-3}$ | 3.2 | 30 |
| Example 3 | 3.3 | $6.1 \times 10^{-4}$ | 3.8 | $2.5 \times 10^{-3}$ | 2.9 | 32 |
| Example 4 | 4.2 | $7.2 \times 10^{-4}$ | 3.7 | $2.7 \times 10^{-3}$ | 1.5 | 31 |
| Example 5 | 3.7 | $7.5 \times 10^{-4}$ | 3.9 | $2.5 \times 10^{-3}$ | 1.6 | 33 |
| Example 6 | 3.4 | $5.8 \times 10^{-4}$ | 4.2 | $2.3 \times 10^{-3}$ | 3.1 | 35 |
| Example 7 | 3.2 | $4.4 \times 10^{-4}$ | 4.2 | $2.1 \times 10^{-3}$ | 4.3 | 39 |
| Example 8 | 3.3 | $4.2 \times 10^{-4}$ | 3.9 | $1.5 \times 10^{-3}$ | 1.2 | 35 |
| Example 9 | 3.4 | $6.3 \times 10^{-4}$ | 5.6 | $3.7 \times 10^{-3}$ | 1.8 | 25 |
| Example 10 | 3.5 | $5.7 \times 10^{-4}$ | 5.2 | $2.8 \times 10^{-3}$ | 1.5 | 23 |
| Example 11 | 4.8 | $8.3 \times 10^{-4}$ | 6.4 | $3.9 \times 10^{-3}$ | 1.7 | 27 |
| Example 12 | 4.8 | $7.6 \times 10^{-4}$ | 6.2 | $2.7 \times 10^{-3}$ | 1.9 | 29 |
| Example 13 | 5.2 | $8.8 \times 10^{-4}$ | 7.5 | $4.8 \times 10^{-3}$ | 1.8 | 25 |
| Example 14 | 5.3 | $8.1 \times 10^{-4}$ | 7.3 | $4.5 \times 10^{-3}$ | 3.1 | 26 |

TABLE 5-continued

Results of performance test

| | | | | | | |
|---|---|---|---|---|---|---|
| Example 15 | 3.5 | $6.7 \times 10^{-4}$ | 4.3 | $3.4 \times 10^{-3}$ | 2.2 | 30 |
| Example 16 | 3.6 | $6.2 \times 10^{-4}$ | 4.1 | $2.7 \times 10^{-3}$ | 2.1 | 33 |
| Example 17 | 3.5 | $1.2 \times 10^{-4}$ | 4.4 | $8.0 \times 10^{-3}$ | 2.7 | 35 |
| Example 18 | 3.9 | $9.7 \times 10^{-4}$ | 3.7 | $6.2 \times 10^{-4}$ | 1.2 | 27 |

| | Item | | | | | |
|---|---|---|---|---|---|---|
| Number | Heat distortion temperature (° C.) | Tensile Strength (MPa) | Tensile strain at break (%) | Bending strength (MPa) | Weight-average molecular weight of LCP derivative | Polydispersity index |
| Example 1 | 231 | 109 | 8 | 138 | 24384 | 1.17 |
| Example 2 | 245 | 103 | 5 | 111 | 23758 | 1.15 |
| Example 3 | 237 | 107 | 6 | 126 | 24697 | 1.21 |
| Example 4 | 225 | 115 | 11 | 145 | 25616 | 1.09 |
| Example 5 | 233 | 109 | 8 | 139 | 21541 | 1.07 |
| Example 6 | 233 | 109 | 8 | 139 | 29478 | 1.21 |
| Example 7 | 235 | 110 | 9 | 140 | 31841 | 1.24 |
| Example 8 | 235 | 115 | 12 | 148 | 22493 | 1.14 |
| Example 9 | 238 | 104 | 7 | 125 | 27549 | 1.19 |
| Example 10 | 232 | 112 | 8 | 128 | 24574 | 1.07 |
| Example 11 | 238 | 110 | 6 | 125 | 22187 | 1.16 |
| Example 12 | 235 | 114 | 7 | 126 | 23568 | 1.20 |
| Example 13 | 242 | 108 | 5 | 116 | 25370 | 1.14 |
| Example 14 | 239 | 113 | 6 | 119 | 25174 | 1.21 |
| Example 15 | 232 | 107 | 8 | 139 | 26854 | 1.17 |
| Example 16 | 229 | 108 | 8 | 137 | 27982 | 1.12 |
| Example 17 | 220 | 115 | 13 | 148 | 21045 | 1.05 |
| Example 18 | 245 | 97 | 4 | 124 | 33514 | 1.25 |

In order to assess the stability of the composite material product of the present invention, the following two groups of experiments were designed specially to examine the product of the present invention and the product of Chinese patent ZL 201110142208.3. The product of Example 10 in the present invention and the product of Example 1 in Chinese patent ZL 201110142208.3 (contrast product) were selected to be compared, results were shown in Table 6.

The first group of experiments examined main electrical technical indicators of products at different frequencies. It can be seen that the enhanced frequency has little effect on the technical indicators of the product in the present invention, from a practical point of view, the application scope of the product can be broaden and the frequency response bandwidth can be increased. The second group of experiments examined the anti-aging quality of the products, specifically measured the change rates of technical indicators after the products being exposed at 1.50° C. for one week. This also may reflect that whether the composite materials maintain the original characteristics, or are dissociated (or part dissociated), results are shown in Table 6. It can be seen that the product of Example 10 in the present invention has very significant stability in terms of frequency changing and anti-aging quality.

TABLE 6

Results of product of Example 10 compared to contrast product

| | | Test sample | | | Test sample | |
|---|---|---|---|---|---|---|
| | Conditions and results | Product of Example 10 | Contrast product | Conditions and results | Product of Example 10 | Contrast product |
| The first group of experiments | Permittivity $\varepsilon_r$ (@3 GHz) | 3.49 | 2.80 | Dielectric loss tangent tan$\delta$ (@3 GHz) | $5.9 \times 10^{-4}$ | $9.60 \times 10^{-4}$ |
| | Permittivity $\varepsilon_r$ (@4 GHz) | 3.47 | 2.75 | Dielectric loss tangent tan$\delta$ (@4 GHz) | $5.8 \times 10^{-4}$ | $1.13 \times 10^{-3}$ |
| | Permittivity $\varepsilon_r$ (@5 GHz) | 3.48 | 2.71 | Dielectric loss tangent tan$\delta$ (@5 GHz) | $5.9 \times 10^{-4}$ | $1.22 \times 10^{-3}$ |
| | Permittivity $\varepsilon_r$ (@6 GHz) | 3.50 | 2.65 | Dielectric loss tangent tan$\delta$ (@6 GHz) | $5.7 \times 10^{-4}$ | $1.29 \times 10^{-3}$ |
| | Permittivity $\varepsilon_r$ (@7 GHz) | 3.49 | 2.54 | Dielectric loss tangent tan$\delta$ (@7 GHz) | $6.0 \times 10^{-4}$ | $1.31 \times 10^{-3}$ |
| | Permittivity $\varepsilon_r$ (@8 GHz) | 3.51 | 2.42 | Dielectric loss tangent tan$\delta$ (@8 GHz) | $5.8 \times 10^{-4}$ | $1.42 \times 10^{-3}$ |
| | Permittivity $\varepsilon_r$ (@9 GHz) | 3.48 | 2.37 | Dielectric loss tangent tan$\delta$ (@9 GHz) | $6.1 \times 10^{-4}$ | $1.54 \times 10^{-3}$ |
| | Permittivity $\varepsilon_r$ (@10 GHz) | 3.49 | 2.27 | Dielectric loss tangent tan$\delta$@10 GHz) | $5.7 \times 10^{-4}$ | $1.68 \times 10^{-3}$ |
| | Permeability $\mu_r$ (@3 GHz) | 5.10 | 5.30 | Magnetic loss tan$\delta_m$ (@3 GHz) | $3.0 \times 10^{-3}$ | $3.70 \times 10^{-3}$ |

TABLE 6-continued

Results of product of Example 10 compared to contrast product

| | | Test sample | | | Test sample | |
|---|---|---|---|---|---|---|
| Conditions and results | | Product of Example 10 | Contrast product | Conditions and results | Product of Example 10 | Contrast product |
| | Permeability $\mu_r$ (@4 GHz) | 5.04 | 5.15 | Magnetic loss $\tan\delta_m$ (@4 GHz) | $3.2 \times 10^{-3}$ | $4.10 \times 10^{-3}$ |
| | Permeability $\mu_r$ (@5 GHz) | 4.97 | 4.86 | Magnetic loss $\tan\delta_m$ (@5 GHz) | $3.3 \times 10^{-3}$ | $5.30 \times 10^{-3}$ |
| | Permeability $\mu_r$ (@6 GHz) | 4.92 | 4.67 | Magnetic loss $\tan\delta_m$ (@6 GHz) | $3.5 \times 10^{-3}$ | $6.90 \times 10^{-3}$ |
| | Permeability $\mu_r$ (@7 GHz) | 4.87 | 4.38 | Magnetic loss $\tan\delta_m$ (@7 GHz) | $3.4 \times 10^{-3}$ | $8.70 \times 10^{-3}$ |
| | Permeability $\mu_r$ (@8 GHz) | 4.80 | 4.14 | Magnetic loss $\tan\delta_m$ (@8 GHz) | $3.6 \times 10^{-3}$ | $1.30 \times 10^{-2}$ |
| | Permeability $\mu_r$ (@9 GHz) | 4.71 | 3.95 | Magnetic loss $\tan\delta_m$ (@9 GHz) | $3.7 \times 10^{-3}$ | $2.70 \times 10^{-2}$ |
| | Permeability $\mu_r$ (@10 GHz) | 4.67 | 3.69 | Magnetic loss $\tan\delta_m$ (@10 GHz) | $3.6 \times 10^{-3}$ | $3.80 \times 10^{-2}$ |
| The second group of experiments | Original permittivity $\varepsilon_r$ (@3 GHz) | 3.49 | 2.80 | Original Dielectric loss tangent $\tan\delta$ (@3 GHz) | $5.9 \times 10^{-4}$ | $9.60 \times 10^{-4}$ |
| | Change rate of permittivity $\varepsilon_r$ after high temperature aging (@3 GHz) | 1.20% | 26% | Change rate of Dielectric loss tangent after high temperature aging (@3 GHz) | 9.20% | 87% |
| | Original permeability $\mu_r$ (@3 GHz) | 5.1 | 5.30 | Original magnetic loss $\tan\delta_m$ (@3 GHz) | $3.0 \times 10^{-3}$ | $3.70 \times 10^{-3}$ |
| | Change rate of permeability after high temperature aging @ (3 GHz) | 14.30% | 39.70% | Change rate of magnetic loss $\tan\delta_m$ after high temperature aging (@3 GHz) | 9.70% | 95.4% |

While the present invention has been described with reference to the preferred embodiments thereof, it should be understood by those skilled in the art that various modifications, additions and substitutions may be made without departing from the true spirit and scope of the invention.

What is claimed is:

1. A preparation method of an LCP derivative/soft magnetic ferrite composite material comprising the following structural units:

a b c and the molar ratio of (a+b) to c is 1:1, the preparation method comprising the steps of:
  A. reacting 2,5-dimethyl-p-acetoxybenzoic acid, 2,5-dimethyl-p-aminobenzoic acid and 1,5-dimethyl-6-acetyloxy-2-naphthoic acid in presence of an acidic catalyst to prepare a LCP derivative oligomer;
  B. polarizing the LCP derivative oligomer obtained in the step A to form a helical oligomer;
  C. mixing the helical oligomer obtained in the step B with soft magnetic ferrite particles and subjecting to host-guest complex assembly; and
  D. polycondensating the complex assembled material obtained in the step C to obtain the said composite material.

2. The preparation method according to claim 1, wherein the step A comprises: dissolving 2,5-dimethyl-p-acetoxybenzoic acid, 2,5-dimethyl-p-aminobenzoic acid and 1,5-dimethyl-6-acetyloxy-2-naphthoic acid in acetic anhydride, adding concentrated sulfuric acid as a catalyst and reacting for 2 to 5 hours at 280~310° C. to prepare the LCP derivative oligomer; wherein, (2,5-dimethyl-p-acetoxybenzoic acid and 2,5-dimethyl-p-aminobenzoic acid):1,5-dimethyl-6-acetyloxy-2-naphthoic:aceticanhydride:concentrated sulfuric acid is in the molar ratio of 1:1:5~15:0.005~0.02.

3. The preparation method according to claim 1, wherein the step B comprises: dissolving the LCP derivative oligomer obtained in the step A in acetic anhydride to form a solution having a volume percentage concentration of 20~50%, then polarizating for 1~3 hours in an electric field generator under stirring.

4. The preparation method according to claim 3, wherein the pulse voltage of the electric field generator is −100~100 V, the pulse current thereof is 200~250 mA, and the stirring speed in the polarization is 2500~3000 R/min, and after polarization, the stirring speed is reduced to 1000~1200 R/min and maintains for 3~4 hours to obtain the helical oligomer.

5. The preparation method according to claim 1, wherein the step C comprises: dissolving the soft magnetic ferrite particles in alkyl imidazolium ionic liquid, mixing with the helical oligomer obtained in the step B at 40~60° C. and complex assembling for 3~8 hours, then adding water to remove the ionic liquid by extraction.

6. The preparation method according to claim 5, wherein the ionic liquid is 3~6 times molar amount of the soft magnetic ferrite particles, and the ionic liquid is selected from $[Bmim]^+[PF_6]^-$, $[Bmim]^+[BF_4]^-$ or $[Bmim]^+[HSO_4]^-$.

7. The preparation method according to claim 1, wherein the step D comprises: polycondensating the complex assembled material obtained in the step C for 6~12 hours in a vacuum internal mixer, followed by extruding and pelletizing, to obtain the composite material, wherein the polycondensation temperature is 325~340° C., and the vacuum degree of the vacuum internal mixer is from 200 Pa to 1 KPa.

8. The preparation method of the LCP derivative/soft magnetic ferrite composite material according to claim 1, wherein the weight-average molecular weight of the LCP derivative is 20000~35000.

9. The preparation method of the LCP derivative/soft magnetic ferrite composite material according to claim 1, wherein the molar ratio of the structural unit c to the soft magnetic ferrite particles is 5-6:1.

10. The preparation method of the LCP derivative/soft magnetic ferrite composite material according to claim 1, wherein the soft magnetic ferrite particles are manganese/zinc (MnZn) ferrite or nickel/zinc (NiZn) ferrite.

\* \* \* \* \*